Patented Sept. 20, 1932

1,878,761

UNITED STATES PATENT OFFICE

JOHN DAVIES, OF WATERLOO, LIVERPOOL, ENGLAND

PROCESS OF COATING METALLIC SURFACES FOR PREVENTION OF CORROSION

No Drawing. Application filed May 11, 1931, Serial No. 536,675, and in Great Britain June 23, 1930.

This invention relates to a process for coating metallic surfaces for preventing corrosion of the same, the process being particularly applicable to the treatment of tanks, especially ships' tanks, though it would be also available for coating boiler tubes or metal surfaces generally. In tank steamers, the tanks used for carrying oil, treacle, molasses, or other material in bulk are also sometimes required for ballast, being then filled with salt water. It is found that the coatings hitherto applied to such tank surfaces for their protection is very detrimentally affected when the tanks are filled with salt water and further, even though such tanks may not be used in this way for ballast the steaming down of such tanks after emptying also results in corrosion being set up, the corrosive action ultimately weakening the plates to a considerable extent and entailing very costly repairs. The present invention is directed to a process which is particularly suitable for treating ships' tanks whereby they shall be immune against corrosion due to the alternate use of the tanks for carrying bulk cargo such as molasses, petrol, benzol, or oils generally, and for water ballast.

According to this invention the metallic surfaces to be protected are, after cleaning, coated with a composition or paint having a considerable free lime content, with preferably the addition of a small percentage of a preservative, the whole being intermixed with a binder such as glue, size, casein, or other similar adhesive. The preparatory coating when dry is treated with a silicon ester medium in liquid form preferably containing a small proportion of formaldehyde, a chemical combination with the primary coating taking place and a silicate of lime being formed producing on the primary coating a hard tough surface entirely unaffected by salt water, steam, molasses, vegetable and mineral oils, spirits or solvents. The silicon ester medium may be applied with a brush or sprayed, and if desired a final finish may be imparted to the coating when dry by treating it with a cellulose lacquer or cellulose varnish.

In carrying out the process the primary coating is prepared by mixing a binder such as casein, blood serum, egg albumen, algine, gelatine, or vegetable proteins, with Portland or hydraulic cement or lime to which is preferably added magnesite and/or asbestine, and a small quantity of a preservative such as resorcin. The material, finely ground, is mixed with water and any desired colouring matter may be added. The resulting paint-like composition may then be applied to the metallic surface to be protected by a brush, by spraying or otherwise. Alternatively, the materials as above may be ground to a stiff paste in an oil such as a mineral or paraffin oil or a coal tar, vegetable, or animal oil. In use the paste is mixed with an equal weight of water, an emulsion being produced having a paint-like consistency. One or more coats of the material may be applied to the surface to be protected. As an example the primary coating may be made up of:—

Portland cement _____ 65 lbs.
Casein _____ 10 lbs.
Magnesite _____ 15 lbs.
Asbestine _____ 10 lbs.
Resorcin or other preservative _____ 4 ozs.

These materials are ground to a stiff paste with:—

White spirit _____ 4 gallons

When the surface to be protected has been coated with this material it is allowed thoroughly to dry and the second coating is then applied.

The second coating consists of a colloidal solution of silica (silicon ester) containing about 2 per cent. of formaldehyde.

On the application of the second coating a chemical reaction takes place, a silicate of lime being formed which fills up the pores of the primary coating, converting it into a dense, tough and water-proof layer, the lime of the primary coating protecting the metallic surface from exterior influences liable to set up corrosion.

As mentioned any suitable colouring matter may be added to the primary coating and if desired a little linseed oil may be added to the colloidal solution of silica forming an insoluble linoleate with the lime of the primary coating and rendering it more waterproof.

A final coating of cellulose lacquer containing approximately 2 per cent. formaldehyde may be applied or a mixture of cellulose lacquer with a colloidal solution of silica. The cellulose lacquer forms a tough outer skin.

As applied to a metallic surface, such as the interior of a tank in which water, oil or spirit is carried, the process is found to be very effective, the surface after treatment as described offering great resistance to corrosion.

The term "free lime" used herein denotes lime uncombined with any acid and does not cover carbonate of calcium which would not react with the silicon ester to form a silicate of lime.

I claim:—

1. A process of protecting a metallic surface against corrosion by salt water, steam, molasses, vegetable and mineral oils, spirits or solvents, in which the surface is first coated with a composition containing a high percentage of free lime and a binder and this primary coating after drying is treated with a silicon ester medium in liquid form, said lime interacting with said silicon ester to form a silicate of lime.

2. A process of protecting a metallic surface against corrosion by salt water, steam, molasses, vegetable and mineral oils, spirits or solvents in which the surface is first coated with a composition containing a high percentage of free lime and a binder, this primary coating after drying is treated with a silicon ester medium in liquid form and a coating of cellulose lacquer is finally applied, said lime interacting with said silicon ester to form a silicate of lime.

3. A process of protecting a metallic surface against corrosion by salt water, steam, molasses, vegetable and mineral oils, spirits or solvents in which the surface is first coated with a composition made up of Portland cement, magnesite and asbestine and a binder selected from the group consisting of casein, blood serum, and gelatine all ground to a stiff paste with white spirit and thinned and this primary coating after drying is treated with a colloidal solution of silica (silicon ester) containing a small percentage of a preservative such as formaldehyde, the free lime of said Portland cement interacting with said silicon ester to form a silicate of lime.

4. A process of protecting a metallic surface against corrosion by salt water, steam, molasses, vegetable and mineral oils, spirits or solvents in which the surface is first coated with a composition made up of Portland cement, magnesite and asbestine and a binder selected from the group consisting of casein, blood serum and gelatine, with a small quantity of a preservative such as resorcin, and this primary coating after drying is treated with a colloidal solution of silica (silicon ester) to which is added linseed oil and a preservative, the free lime of said Portland cement interacting with said silicon ester to form a silicate of lime.

In testimony whereof I affix my signature.
JOHN DAVIES.